US008740183B2

(12) United States Patent
Hauri et al.

(10) Patent No.: US 8,740,183 B2
(45) Date of Patent: Jun. 3, 2014

(54) ACTIVELY CONTROLLED VALVE AND METHOD FOR OPERATING AN ACTIVELY CONTROLLED VALVE

(75) Inventors: Philipp Hauri, Zurich (CH); Markus Friedl, Zurich (CH); Andreas Schlegel, Langnau Am Albis (CH); Alexandre Voser, Elsau (CH); Markus Lehmann, Oberstammheim (CH)

(73) Assignee: Burckhardt Compression AG, Winterthur (CH)

( * ) Notice: Subject to any disclaimer, the term of this patent is extended or adjusted under 35 U.S.C. 154(b) by 216 days.

(21) Appl. No.: 12/738,254

(22) PCT Filed: Oct. 15, 2008

(86) PCT No.: PCT/EP2008/063914
§ 371 (c)(1),
(2), (4) Date: Apr. 15, 2010

(87) PCT Pub. No.: WO2009/050215
PCT Pub. Date: Apr. 23, 2009

(65) Prior Publication Data
US 2010/0247359 A1 Sep. 30, 2010

(30) Foreign Application Priority Data

Oct. 18, 2007 (WO) ................. PCT/EP2007/061143

(51) Int. Cl.
*F16K 31/02* (2006.01)
*F16K 25/00* (2006.01)
*F16K 27/02* (2006.01)
*F16K 3/08* (2006.01)
*F16F 1/14* (2006.01)

(52) U.S. Cl.
USPC . 251/129.11; 251/160; 251/336; 137/625.31; 267/154

(58) Field of Classification Search
USPC ............... 251/129.06, 129.11, 158, 160, 161, 251/336, 337, 84, 85; 137/554, 625.31; 267/154
See application file for complete search history.

(56) References Cited

U.S. PATENT DOCUMENTS 2,364,697 A * 12/1944 Daniels ..................... 137/625.29
2,516,795 A * 7/1950 Norton ........................ 123/90.3
(Continued)

FOREIGN PATENT DOCUMENTS

CN 2596128 Y 12/2003
DE 3223557 12/1983
(Continued)

OTHER PUBLICATIONS

International Search Report, issued Jun. 12, 2009, for PCT/EP2008/063914.

*Primary Examiner* — Eric Keasel
*Assistant Examiner* — Kevin Barss
(74) *Attorney, Agent, or Firm* — Pearl Cohen Zedek Latzer Baratz LLP

(57) ABSTRACT

The invention relates to an actively controlled valve (1) having a housing (6) and comprising a displaceably supported valve plate (4) having aperture openings (4a) and a counter plate (2) disposed in a fixed manner relative to the housing (6) and having aperture openings (2a), wherein the valve plate (4) is slidably supported relative to the counter plate (2), such that the penetration openings (2a, 4a) form an open or closed aperture (24), and comprising a drive device (8) driving the valve plate (4), wherein the valve plate (4) is connected to the drive device (8) by means of a drive spring (7), and an actuatable clamping device (10) is provided for fixing the location of the valve plate (4).

14 Claims, 12 Drawing Sheets

(56) References Cited

U.S. PATENT DOCUMENTS

| | | | |
|---|---|---|---|
| 2,718,614 A | | 9/1955 | Gamble |
| 4,156,437 A | * | 5/1979 | Chivens et al. ............... 137/554 |
| 4,496,134 A | | 1/1985 | Idogaki et al. |
| 4,501,297 A | * | 2/1985 | Baker ..................... 137/625.46 |
| 4,536,731 A | | 8/1985 | Kubach et al. |
| 4,577,832 A | | 3/1986 | Sogabe |
| 4,957,274 A | * | 9/1990 | Hood et al. ............... 251/129.12 |
| 5,129,619 A | * | 7/1992 | Castetter ......................... 251/65 |
| 5,158,262 A | * | 10/1992 | Kamerbeek et al. ..... 251/129.11 |
| 5,238,023 A | * | 8/1993 | Olofsson ................. 137/596.17 |
| 5,531,205 A | | 7/1996 | Cook et al. |
| 5,669,411 A | * | 9/1997 | LeGros et al. ........... 137/516.21 |
| 5,842,680 A | * | 12/1998 | Bustamante et al. ........... 251/65 |
| 6,416,032 B2 | * | 7/2002 | Oh .................................. 251/14 |
| 6,808,370 B1 | | 10/2004 | Soarez |
| 7,183,695 B2 | * | 2/2007 | Kienzler et al. ............... 310/328 |

FOREIGN PATENT DOCUMENTS

| | | |
|---|---|---|
| EP | 0971160 | 4/2005 |
| FR | 2834119 | 6/2003 |
| WO | WO 01/59266 | 8/2001 |
| WO | WO 01/65157 | 8/2001 |

* cited by examiner

US 8,740,183 B2

ACTIVELY CONTROLLED VALVE AND METHOD FOR OPERATING AN ACTIVELY CONTROLLED VALVE

CROSS-REFERENCE TO RELATED APPLICATIONS

This application is a National Phase Application of PCT International Patent Application No. PCT/EP2008/063914, International Filing Date Oct. 15, 2008, which claims priority from PCT International Patent Application No. PCT/EP2007/061143, International Filing Date Oct. 18, 2007, both of which are incorporated by reference herein in their entirety.

FIELD OF THE INVENTION

The invention relates to an actively controlled valve as well as to a method for the operation of an actively controlled valve.

BACKGROUND OF THE INVENTION

In conventional compressor valves such as have been used for more than 100 years, an equilibrium of forces of spring forces and compressive forces at a closing body have the result that this closing body is moved away from the valve seat in the direction of flow. Closing bodies are usually plates, but can also be knobs. The fact is disadvantageous in this type of construction that the fluid has to flow around the closing body and in this respect undergoes a change of direction twice. This has the consequence that a larger pressure drop occurs at the valve and moreover has the effect that a narrow flow cross-section is formed along which the fluid has a high flow speed.

Document U.S. Pat. No. 6,149,400 discloses a conventional valve of plate-type construction. The movement of the plate can be influenced by an additional force from a magnetic coil so that the plate is moved in a delayed manner from the open position into the closed position. The above-described disadvantages remain present, however.

Document EP 0 971 160 B1 discloses an actively controlled valve for a piston compressor. The valve includes a valve plate which is rotatably supported with respect to a counter-plate either to open or to close a passage opening by rotation. The valve plate is in this respect moved directly by an external drive. The fact is disadvantageous in these known concepts that they can only be actuated slowly and imprecisely. Valves in accordance with documents WO 01/65157 and WO 01/59266 A1, which described a slightly modified form of the already described patent, have the same disadvantage.

SUMMARY OF THE INVENTION

It is the object of the present invention to form an actively controlled valve which has more advantageous operating properties.

The object is in particular satisfied by an actively controlled valve having a housing, including a movably supported valve plate having passage openings as well as a counter plate fixedly arranged with respect to the housing and having passage openings, with the valve plate being movably supported with respect to the counter-plate such that the passage openings form an opened or a closed passage and including a drive apparatus which drives the valve plate, with the valve plate being connected to the drive apparatus via a drive spring and with a controllable holding apparatus being operatively arranged such that the position of the valve plate can be fixed.

In a particularly advantageous embodiment, the valve plate is turnably or rotatably supported about a longitudinal axis. Such a valve is also called a rotary valve. The drive spring is advantageously designed as a torsion spring extending concentrically to the longitudinal axis and connecting the drive apparatus to the valve plate.

In a further embodiment, the valve plate is displaceably supported, in particular linearly displaceably supported, in the direction of extent of the valve plate.

The object is furthermore in particular satisfied by a method for the operation of an actively controlled valve including a movably supported valve plate, a fixedly arranged counter-plate, a drive apparatus connected to the valve plate via a drive spring and a controllable holding device, with the valve plate being held fixedly in its position by the holding apparatus, the drive spring then being tensioned by the drive apparatus, the valve plate then being released by the holding apparatus so that the valve plate is moved by the energy stored in the drive spring and the valve plate then again being held in its stationary state or almost stationary state by the holding apparatus. The holding apparatus can advantageously be activated very fast, for example in that the holding apparatus includes a piezoelectric drive which serves for the drive of the holding apparatus. Such a valve can be opened or closed within a very short time of down to less than 1 ms.

The valve in accordance with the invention or the method in accordance with the invention has the advantage in an advantageous embodiment that the drive energy which is required to move the valve plate is stored at least in substantial amounts or even fully in the drive spring and that a controllable holding apparatus is provided which can preferably be activated very fast and which fixes or releases the position of the valve plate. Once the drive spring has been tensioned, the mechanical inertia of the drive apparatus no longer acts on the switching time of the valve. The switching time is essentially determined by the energy stored in the drive spring, by the inertia of the moved components, in particular of the valve plate, and by the speed of the holding apparatus. The valve in accordance with the invention designed in this manner therefore has extremely short switching times between the open position and the closed position.

During the operation of the valve, it is the object of the drive apparatus to ensure that respectively sufficient energy is stored in the drive spring to move the valve plate. For this purpose, in an advantageous embodiment, the valve is held by the holding apparatus during the stationary state and the drive apparatus is actuated during this state to tension the drive spring additionally so that again sufficient energy is stored in the drive spring to move the valve plate on the next following release of the holding apparatus.

The valve in accordance with the invention is preferably operated such that the valve plate is in the stationary state or in the approximately stationary state on the actuation of the holding apparatus, that is on the release or fixedly holding of the holding apparatus. The holding apparatus thus engages at the movable part in the stationary state or in the approximately stationary state, which has the advantage that the holding apparatus is subject to an extremely small wear. The valve in accordance with the invention can therefore be operated maintenance-free over a long time and therefore has an extremely long service life.

In a particularly advantageous embodiment, the valve plate is connected to the housing via a holding spring extending concentrically to the drive spring. In a particularly advantageous embodiment, the spring energy is substantially stored or accumulated in the holding spring. The accumulation of spring energy in the holding spring preferably takes place in that the valve plate is fixedly held by the holding apparatus, that the drive spring is then tensioned by the drive apparatus in one direction and that the holding apparatus then releases the valve plate, whereupon the valve plate moves and is again fixedly held by the holding apparatus on the reaching of the position of rest. The procedure is thereupon repeated in the other direction, with the valve plate moving a little further each time. As soon as the deflection exceeds a predetermined value, the holding apparatus fixes the position of the valve plate so that the valve plate is held in its position and with a biased holding spring. This wind-up procedure or the tensioning of the holding spring preferably takes place within a time duration of less than one second. An advantage of this wind-up procedure can be seen in that the energy supplied by the drive apparatus is accumulated in the holding spring so that a relatively large spring energy can be stored in the holding spring. In addition, the drive does not have to be able to use the whole torque required for the movement of the valve plate and therefore be designed smaller, lighter and more cost-effectively.

The actively controlled valve in accordance with the invention can be designed either as a pressure valve or as a suction valve and is in particular suitable for piston compressors. The valve in accordance with the invention has the advantages that the passage openings can release a relatively large cross-sectional surface of up to 30% of the surface of the valve plate, that this cross-sectional surface can be released in a very short time of down to less than 2 ms and that the valve does not require any deflection of the flow.

In a further advantageous embodiment, the drive apparatus includes a movable armature which can be attracted in a controllable manner by a plurality of electromagnets so that the armature can be moved by an actuation of the magnets. In an advantageous embodiment, this drive apparatus is moreover also designed as a holding apparatus in that the electromagnet remains active over a certain time and the armature can thereby be held in a defined position. After the deactivation of the electromagnet, the armature is movable again and the holding function of the drive and holding apparatus is thus cancelled.

The valve in accordance with the invention has the following advantages:

fewer flow losses since the passage opening of the valve can have a large flow cross-section which can be approximately twice as large as with conventional valves;

an increase in efficiency due to a very precise opening and closing of the valve time-wise since the time can be determined precisely down to 1 to 2 ms;

since the valve has hardly any wear parts or is subject to very low wear, the valve has a longer service life, which has the consequence of a smaller maintenance effort and thus a longer useful life;

the valve in accordance with the invention can be used as a replacement for exiting valves, with the valve being able to be designed such that no modifications or only insignificant modifications have to be carried out at the compressor;

the valve in accordance with the invention together with the compressor has only a small clearance;

the valve in accordance with the invention allows the conveying amount of the compressor to be regulated because the valve does not have to be closed and opened during each clock cycle, but can rather also be constantly open or constantly closed during at least one clock cycle.

BRIEF DESCRIPTION OF THE DRAWINGS

The invention will be described in the following with reference to embodiments. There are shown.

DETAILED DESCRIPTION OF THE INVENTION

Figure 1:
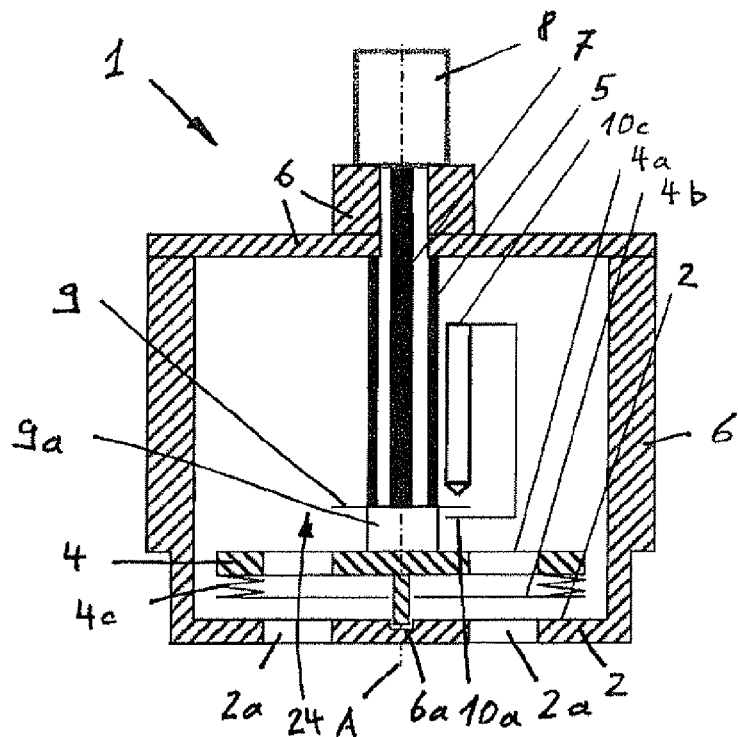
FIG. 1 a longitudinal section through a schematically shown pressure valve in the open state.

FIG. 1 shows an actively controlled valve 1 in a longitudinal section. The valve 1 includes a housing 6, also called a lantern, at which a counter-plate 2 is arranged at the bottom which is called a valve seat in classical valves, which has passage valves 2a and to which a drive 8 is fixedly connected at the top. A disk-shaped valve plate 4 with passage openings 4a is arranged within the housing 6 rotatably about a longitudinal axis A extending perpendicular to the valve plate 4. The valve plate 4, also called a closing body, is moreover rotatably supported in a radial bearing 6a. Both the valve plate 4 and the counter-plate 2 have a plurality of passage openings 2a, 4a which are spaced apart from the longitudinal axis A in the peripheral direction and which are mutually arranged so that they form an open passage 24, as shown, so that a fluid can flow through or, with the rotated valve plate 4, form a closed passage 34 which suppresses a fluid flow. A drive spring 7, which is designed as a torsion spring, extends concentrically to the longitudinal axis A and is fixedly coupled both to the drive 8 and via the connection part 9a also to the valve plate 4 or is fixedly connected thereto. An additional holding spring 5 which is of hollow cylinder shape and which is likewise designed as a torsion spring likewise extends concentrically to the longitudinal axis A and is fixedly connected both to the housing 6 and via the connection part 9a also to the valve plate 4. In addition, a retaining part 9 designed as a disk is arranged concentrically to the longitudinal axis A and is rotatedly fixedly connected to the valve plate 4 via the connection part 9a. A holding apparatus 10 is arranged within the housing 6 and includes an actuator 10c and a holding part 10a. With an activated actuator 10c, the retaining disk 9 is clamped between the actuator 10c and the holding part 10a so that the retaining disk 9 is blocked and the valve plate 4 is thereby held in its respective position. The actuator 10 is preferably designed as a piezoelectric converter or as a piezoelectric actuator. It has the advantage that a very fast actuation or a very fast retention and release is possible in the order of milliseconds and that a relatively large holding force or clamping force can be generated, which ensures a secure holding of the retaining disk 9 and thus of the valve plate 4. The holding apparatus 10 designed as a clamping apparatus can be designed in a variety of possibilities, for example also with an electromagnetic actuator 10c or with a pneumatic or hydraulic actuator 10c. The drive apparatus 8 is designed as an electric motor in the embodiment shown. A plurality of other drive systems could also be used as a drive apparatus 8, for example also a hydraulic drive system or a pneumatic drive system.

Figure 2:
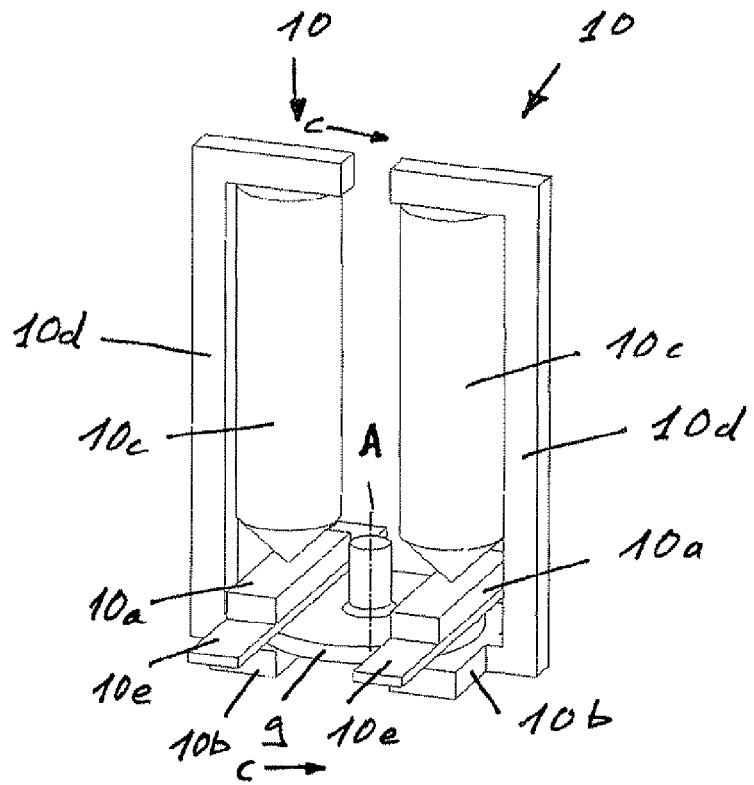
FIG. 2 a perspective view of two holding apparatus.

FIG. 2 schematically shows an embodiment of two holding apparatus 10 arranged next to one another in a perspective view. Each holding apparatus 10 includes a U-shaped connection means 10d which is connected to a piezoelectric converter 10c, on the one hand, and to a holding jaw 10b, on the other hand. In addition, a holding part 10a is fixedly connected to a web 10e, with the web 10e being fixedly connected to the housing 6. The retaining disk 9 is rotatably supported about the axis of rotation A, with the retaining disk 9 extending between the web 10e and the holding jaw 10b so that the retaining disk 9 is clamped or released on the actuation of the converter 10c. The retaining apparatus 10 is arranged in a preferably floating manner with respect to the retaining disk 9 or displaceably in the direction of extent of the axis A to enable a secure holding of the retaining disk 9, in particular also when individual components of the valve have expanded differently, for example due to temperature fluctuations.

Figure 3:
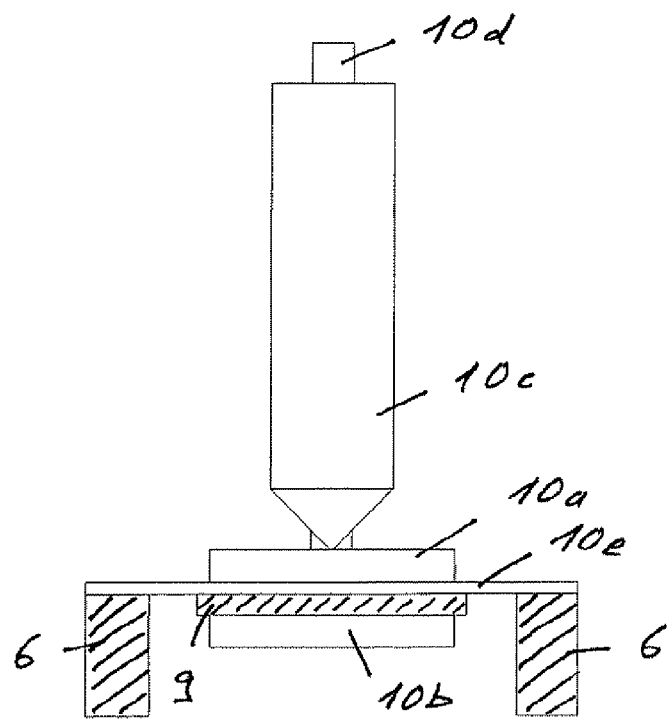
FIG. 3 a section through part components of the holding apparatus from the direction of view C.

FIG. 3 shows a detail of the holding apparatus 10 in a side view. The web 10e is fixedly connected to the housing 6. The holding part 10a is fixedly connected to the web 10e. The holding jaw 10b and the web 10e are arranged between the retaining disk 9. An actuation of the piezoelectric converter 10c effects a closing or opening of the converter 10c and of the holding jaw 10b.

Figure 4A:
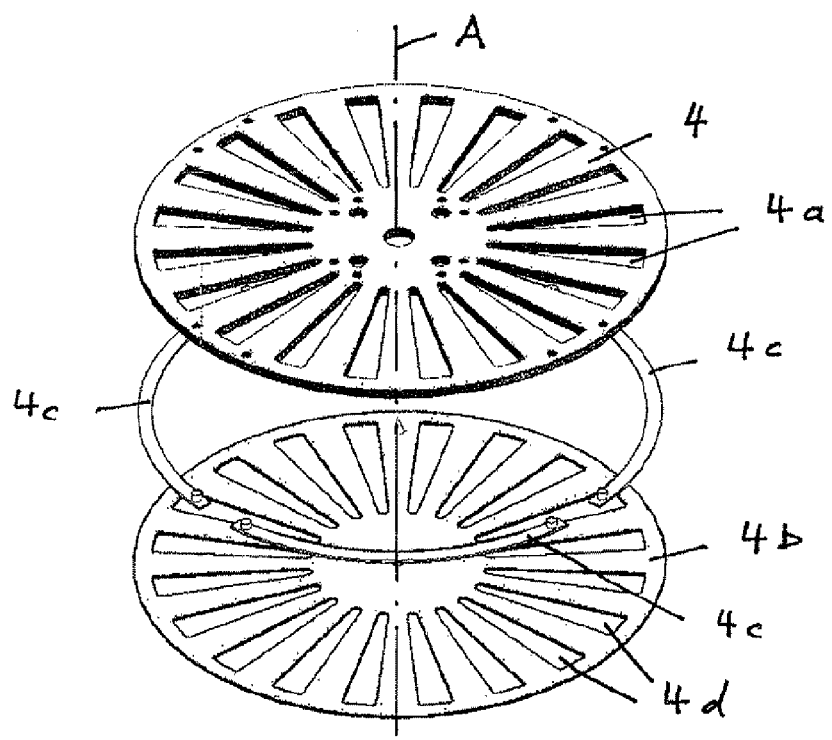
FIG. 4a an explosion drawing of a valve plate with a sealing plate.
Figure 4:
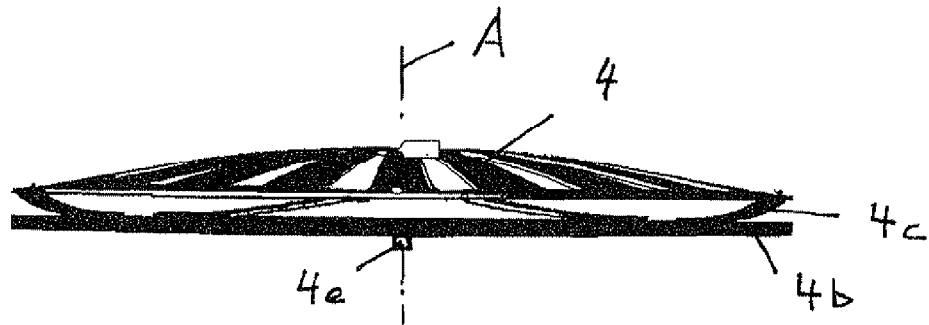
FIG. 4b a side view of the valve plate shown in FIG. 4a with a sealing plate in the assembled state.

FIG. 4a shows a further embodiment of a valve plate 4 in an explosion drawing which has a plurality of alit-shaped passage openings 4a extending radially to the axis of rotation A. The valve plate 4 moreover includes three spring elements 4c which are arranged distributed in the peripheral direction of the valve plate 4 and which hold a sealing plate 4b. The sealing plate 4b likewise has passage openings 4d which are preferably designed and arranged identically and in a flush manner with the passage openings 4a.

FIG. 4b shows the valve plate shown in FIG. 4a and now assembled in a side view. The valve plate 4 is here shown under load and with exaggerated deformation. The sealing plate 4b has a projecting guide pin 4e at the bottom which is supported in the radial bearing 6a shown in FIG. 1. The sealing plate 4b is resiliently supported with respect to the valve plate 4 in the direction of the axis of rotation A via the spring elements 4c. This embodiment has the advantage that the sealing plate 4b is pressed firmly toward the counter-plate 2 with a closed, pressurized valve 1 and is thus in tight contact so that the passage openings 2a of the counter-plate 2 are closed extremely tightly.

Figure 5:
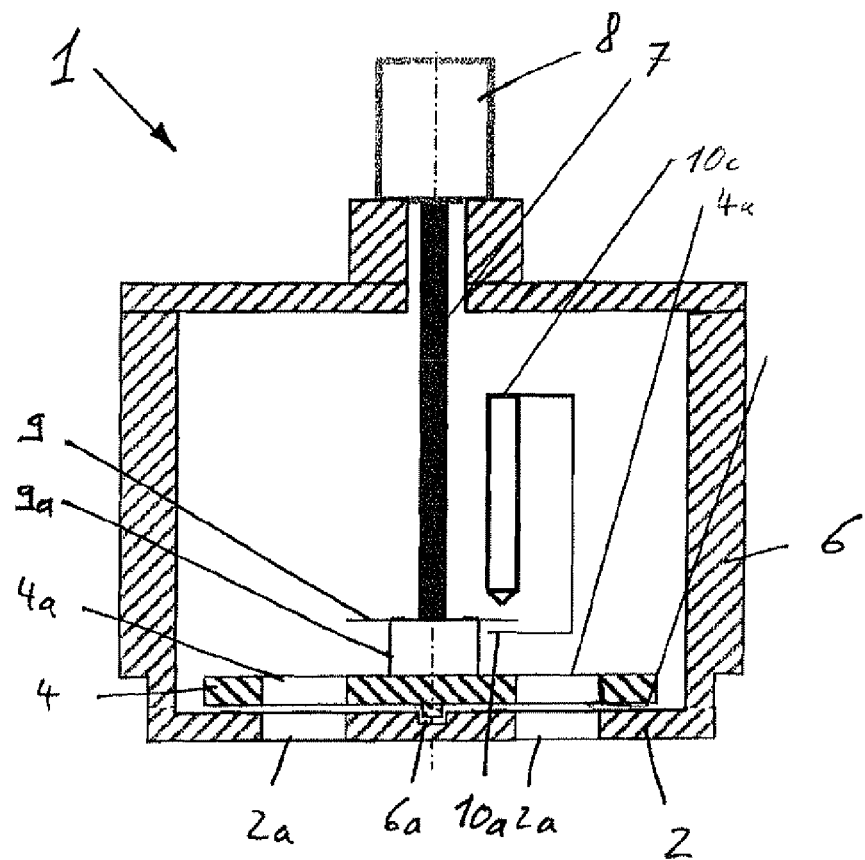
FIG. 5 a longitudinal section through a schematically shown pressure valve with a valve plate without a sealing plate.

FIG. 5 shows a further embodiment of a schematically shown valve 1 which, in contrast to the valve shown in FIG. 1, does not have a holding spring 5. As shown schematically in FIG. 5, the valve plate 4 can moreover also be designed without a sealing plate 4b and a spring element 4c so that the valve plate 4 directly contacts the counter-plate 2 and forms a passage 24 or closes the passage openings 2a depending on the mutual position of the passage openings 4a and the passage openings 2a. A valve plate 4 designed in this manner could also be used in the embodiment shown in FIG. 1.

Figure 6:
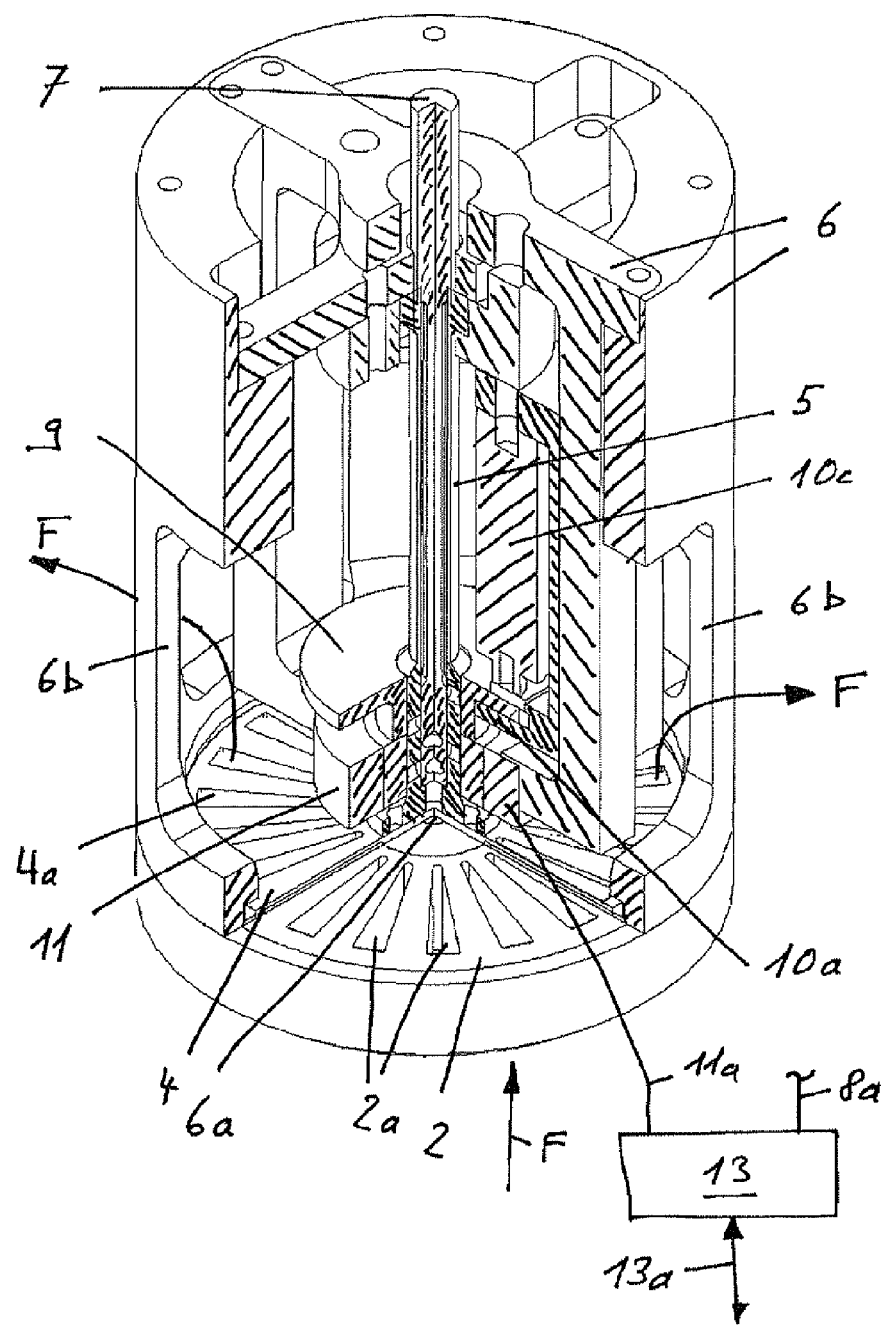
FIG. 6 a longitudinal section through a further embodiment of an actively controlled valve.

FIG. 6 shows a further embodiment of an actively controlled valve 1 in detail in a longitudinal section. The valve 1 includes a housing 6, with the drive apparatus 8 to be arranged at the upper end face of the housing 6 not being shown. A counter-plate 2 having passage openings 2a is arranged in the housing 6. The valve plate 4 with passage openings 4a is rotatably arranged above the counter-plate 2. The housing 6 has lateral openings 6b so that a fluid-conducting connection F is produced between the passage openings 2a, 4a and the lateral openings 6b. A torsion rod designed as a drive spring 7 is fixedly connected to a retaining disk 9. The retaining disk 9 is moreover fixedly connected to the housing 6 via a hollow-cylindrical holding spring 5. A retaining apparatus 10 including a piezoactuator 10c and a brake shoe 10b is arranged in the housing 6 with respect to the retaining disk 9 such that it can be fixedly held or released by the piezoactuator 10a. The retaining disk 9 is rotationally fixedly connected to the valve plate 4. In addition, a position sensor 11 is coupled to the valve plate 4 to detect the angle of rotation of the valve plate 4. In the complete valve 1, the drive spring 7, as shown schematically in FIG. 1, for example, is connected to a drive apparatus 8 which engages at the drive spring 7 at the upwardly projecting end thereof.

Figure 7:
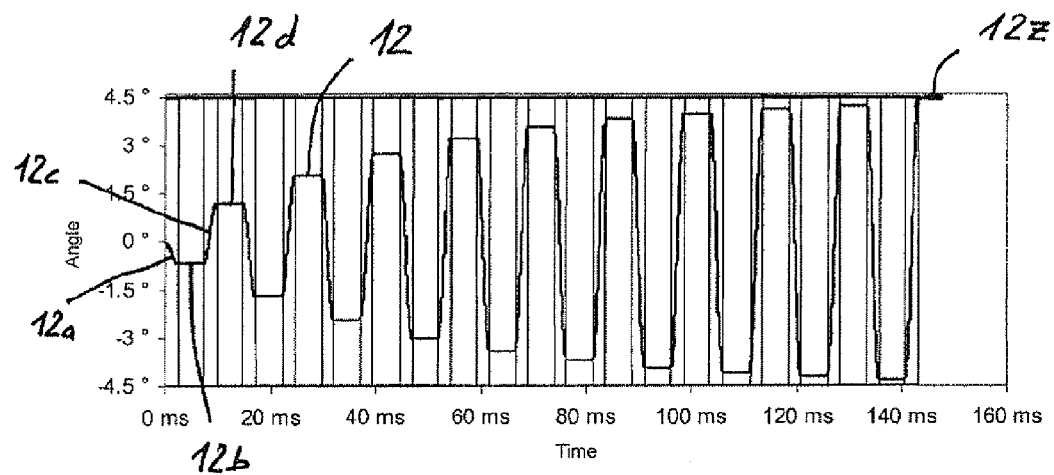
FIG. 7 a diagram of the rotary angle of the valve plate as a function of time during the tensioning of the holding spring.
Figure 8:
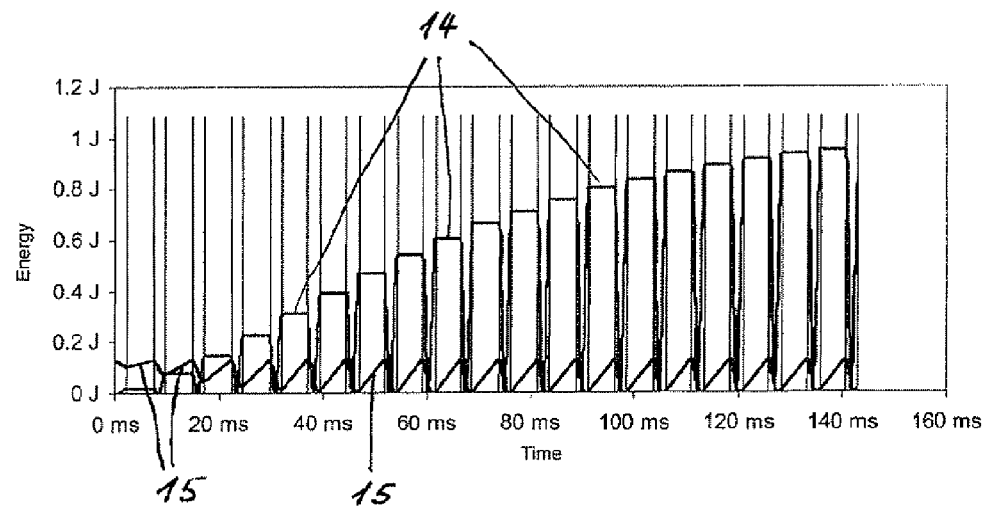
FIG. 8 a diagram of the energy stored in the holding spring and drive spring as a function of time during the procedure in accordance with FIG. 7.

The valve in accordance with FIG. 6 utilizes the spring energy stored in the holding spring 5 to open and to close the valve 1 quickly and moreover very precisely and reproducibly in time via an actuation of the holding apparatus 10. It is therefore of central importance in the valve 1 in accordance with FIG. 6 that respectively sufficient energy is stored in the holding spring 5 to move the valve plate 4 in the demanded time. The drive apparatus 8 essentially serves to supply the holding spring 5 with sufficient spring energy or to rotate the valve plate 4 about such an angular range that sufficient spring energy is stored in the holding spring 5 for an operation of the valve 1. In the embodiment shown in FIG. 6, this spring energy is conducted by the drive apparatus 8 via the drive spring 7 to the valve plate 4 or to the holding spring 5. The drive apparatus 8 can be made so powerful that it is able to provide the total required torque which is, for example, in the order of 50 Nm. Such a drive apparatus 8, however, has the disadvantage that it is relatively large. In a particularly advantageous embodiment of the valve 1, a smaller drive apparatus 8 is therefore used whose torque which can be generated as a maximum is smaller than the torque required to tension the holding spring 5. Such an operating method for the operation of the valve 1 shown in FIG. 6 will now be described in detail with the aid of FIGS. 7, 8 and 9a to 9h. FIGS. 7 and 8 show the first-time tensioning of the holding spring 5.

FIG. 7 shows a diagram of the angle of rotation of the valve plate 4 as a function of time for the embodiments in accordance with FIGS. 1 and 6, with the valve plate 4 being located in a neutral rest position at the time 0 in which a spring energy is stored neither in the holding spring 5 nor in the drive spring 7. In the embodiment shown, it is the goal of the method shown to have rotated the valve plate 4 at the end by an angle of +4.5° and to have fixed it in this position. For this purpose, the drive apparatus 8 effects a torque onto the drive spring 7 in a first method step so that the valve plate 4, as shown by 12a, is rotated by a negative angle and is then, as shown by 12b, held in this position by the holding apparatus 10. The drive apparatus 8 thereupon effects an opposite torque onto the valve plate 4 via the drive spring 7 in a second process step. Then, as shown by 12c, the retaining apparatus 10 opens and closes again as soon as the valve plate 4 moving in the direction of positive angular degrees is located in the rest position or almost in the rest position. The valve plate 4 is thereupon held in the position shown, as shown by 12d. The absolute amount of the rotation of the valve plate 4 has increased in the position in accordance with 12d with respect to the position in accordance with 12b since, in addition to the torque of the drive spring 7, the torque of the holding spring 5 acted on the valve plate 4 so that the valve plate 4, as shown in FIG. 7, has a larger rotation with each additional process step. This process is carried out a plurality of times after one another and is ended in the embodiment shown as soon as the valve plate 4 has rotated by an angle of rotation of at least +4.5° and is fixedly held in this position. Sufficient spring energy is thus stored in the holding spring 5 to operate the valve 1 and the valve plate 4 is located in a working position 12z. The whole procedure to move the valve plate 4 out of the rest position 12 into the working position 12z lasts approximately 145 ms in the embodiment shown. This process is also called winding up or a wind-up process.

FIG. 8 shows, with the same time pattern as already shown in FIG. 7, the spring energy 14 accumulating in the holding spring 5 as a function of time and the spring energy 15 supplied by the drive spring 7 as a function of time. The drive spring 7 is constantly repeatedly tensioned by the drive apparatus 8 with, apart from a transient oscillation at the start of the process, substantially the same spring energy. This spring energy of the drive spring 7 is accumulated in the holding spring 5 during the process as shown. The method in accordance with the invention has the advantage that one drive apparatus 8 is sufficient to tension the holding spring 5, said drive apparatus being able to produce a torque which is substantially smaller than the maximum torque required to tension the holding spring 5. This allows a drive apparatus 8 of small construction to be used, which has the advantage that the drive apparatus 8 is small and less expensive and can moreover be operated faster due to the lower inertia. The tensioning of the holding spring 5 is even possible with a very weak drive apparatus 8 if sufficient process steps 12a, 12b, 12c, 12c are carried out. In other words, the time available as a maximum for the tensioning of the holding spring 5 determines the torque which the drive apparatus 8 has to deliver.

FIGS. 9a to 9h show the positions of the valve plate 4 changing over time during the switching operation of the valve 1 schematically in a plan view of the valve plate 4. The position of the head end of the drive spring 7 which is connected to the drive apparatus 8 is likewise shown. The valve plate 4 is in the closed position in FIG. 9a, with the areally shown spring energy 5a being stored in the holding spring 5. The drive apparatus 8 has already moved the drive spring 7 into the required position for the open position of the valve 1 so that the areally shown spring energy 7a is stored in the drive spring 7. The areas of the spring energies 5a and 7a are proportional to the energies stored in the holding spring 5 or in the drive spring 7 at the respective time. These areas are only shown schematically, with the area 5a or the energy usually stored in the holding spring 5 being substantially larger in the state shown in FIG. 9a than the area 7a or the energy stored in the drive spring 7. The area 5a or the stored energy is advantageously at least ten times larger than the area 7a.

Figure 9:
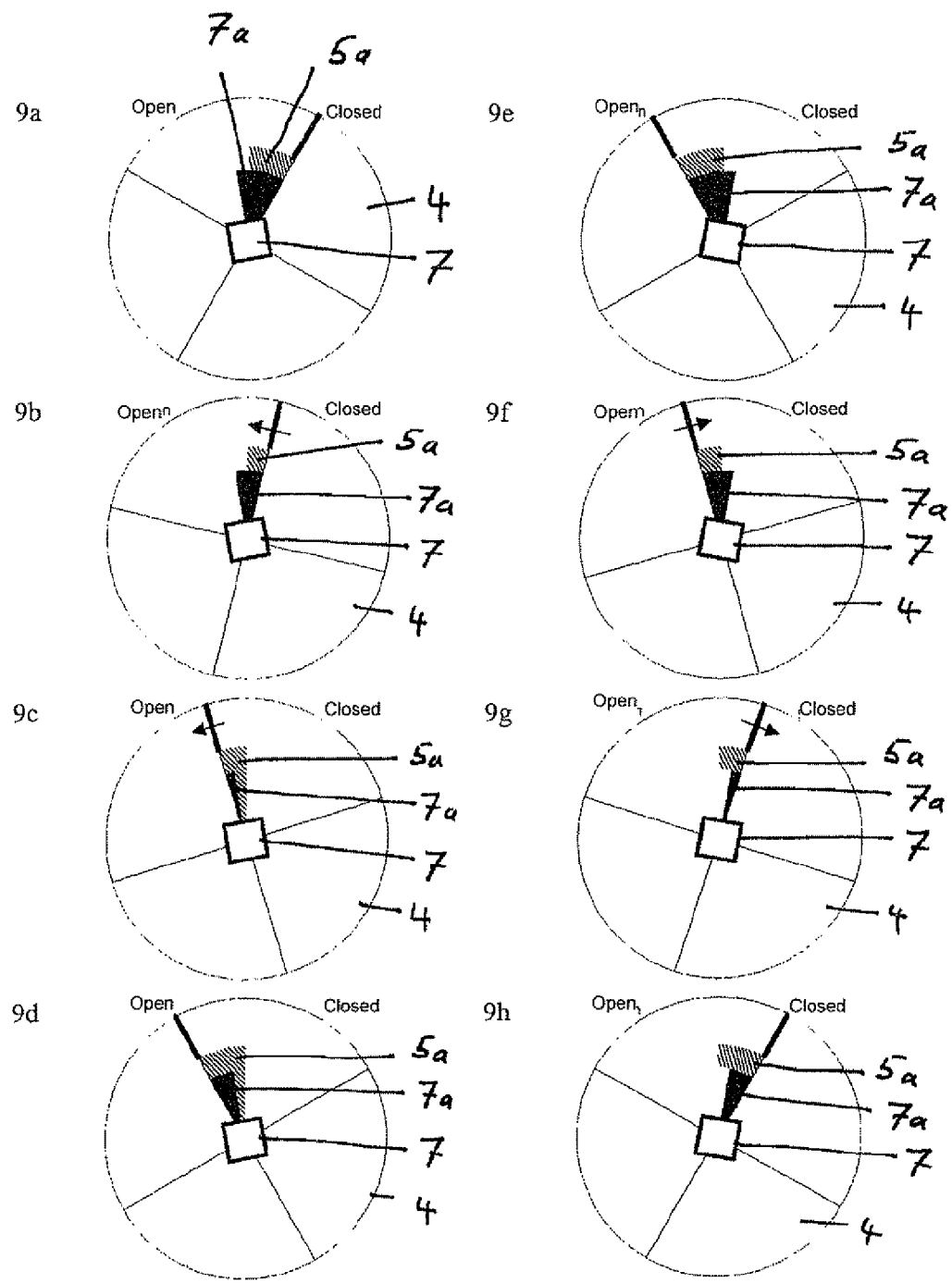
FIGS. 9a to 9h the position of the valve plate and the energy stored in the holding spring and drive spring at different times.

In FIG. 9b, the retaining apparatus 10 is released so that the valve plate 4 moves in the direction of the open position, with the energy stored in the spring 5 and 7 being reduced, in favor of the kinetic energy which is taken up by the parts in motion, in particular the valve plate 4, the retaining disk 9 and the connection part 9a.

In FIG. 9c, the kinetic energy is again increasingly being transferred into the springs 5 and 7. As soon as the total kinetic energy has been depleted, the valve plate 4, as shown in FIG. 9d, becomes stationary in the open position and is fixed in this position by the retaining apparatus 10. The spring energy 7a provided by the drive spring 7 in FIG. 9a is preferably determined such that the passage openings 4a of the valve plate 4 come to lie flush with the passage openings 2a of the counterplate 2 as soon as the valve plate 4 is stationary. If this should not be the case, the position of the valve plate 4 can be brought directly to stationary by actuating the retaining apparatus 10. The position of the valve plate 4 can be measured via the position sensor 11. The spring energy 7a supplied in the state in accordance with FIG. 9a is advantageously controlled or dimensioned such that the valve plate 4 becomes stationary in the previously named ideal position. This produces the advantage that the retaining apparatus 10 is hardly worn or not worn at all on the blocking of the valve plate 4. A control apparatus 13 is provided for this purpose which detects the signals 11a of the position sensor 11 and controls the drive apparatus 8 accordingly via the line 8a. The control apparatus 13 is, as shown in FIG. 6, connected to a higher-ranking control apparatus via a databus 13a, for example.

To close the valve plate 4, the drive apparatus 8 is actuated, as shown in FIG. 9e, and in this respect the drive spring 7 is rotated with a blocked valve plate 4 so that spring energy is delivered to the drive spring 7 and has the spring energy 7a at the end of the actuation of the drive apparatus 8. Thereupon, as shown in FIG. 9f, the retaining apparatus 10 is opened so that the valve plate 4 moves into the closed position, with the spring energies 5a and 7a being converted into kinetic energy and with the kinetic energy being converted back into spring energies 5a and 7a in the operating state in accordance with FIG. 9g until the valve plate becomes stationary in accordance with FIG. 9h and being fixed by actuation of the retaining apparatus 10.

This procedure shown in FIGS. 9a to 9g is now repeated on each opening or on each closing of the valve 1. The switching time of the valve 1 between the closed position and the open position in accordance with FIG. 9a and FIG. 9d or between the open position and the closed position in accordance with FIGS. 9e and 9h can be very short, and amount to 1 ms for example, in dependence on the design of the valve 1. Switching times in the range between 1 ms and 10 ms are preferably used. The opening and closing of the valve 1 is naturally synchronized with the operating cycle of the corresponding machine, for example a piston compressor. The valve 1 in accordance with the invention can also be controlled very simply such that it does not open and close on each cycle of the piston compressor, but rather, for example, on every 2nd, 3rd or 4th work cycle. This is achieved, for example, in that the holding apparatus 10 remains closed during the corresponding work cycles and the valve 1 thus remains in the respective position. The cycle of the opening and closing of the valve 1 can thus be varied as desired with respect to the work cycle of the piston compressor.

The valve in accordance with the invention can be designed in the form of a suction valve or of a pressure valve. In combination with a piston compressor, the suction valve is arranged such that it allows the medium to flow into the piston space and the pressure valve is arranged such that it allows the medium to flow out of the piston space.

Figure 10:
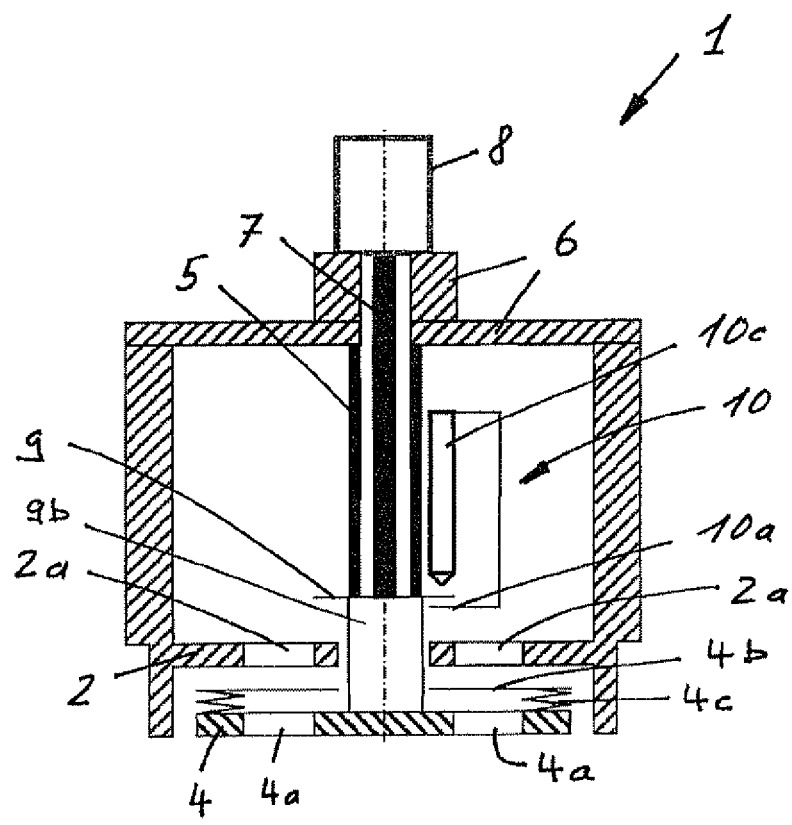
FIG. 10 a longitudinal section through a schematically shown suction valve in the open state.

FIG. 10 shows a schematic longitudinal section through a suction valve 1. This valve 1 has substantially the same design as the valve 1 shown in FIG. 1, with the valve plate 4 naturally being arranged on the oppositely disposed side of the counter-plate 2. The same process or the same apparatus is used for the opening and closing of the valve plate 4 in the pressure valve in accordance with FIG. 1 and in the suction valve in accordance with FIG. 10.

Figure 11:
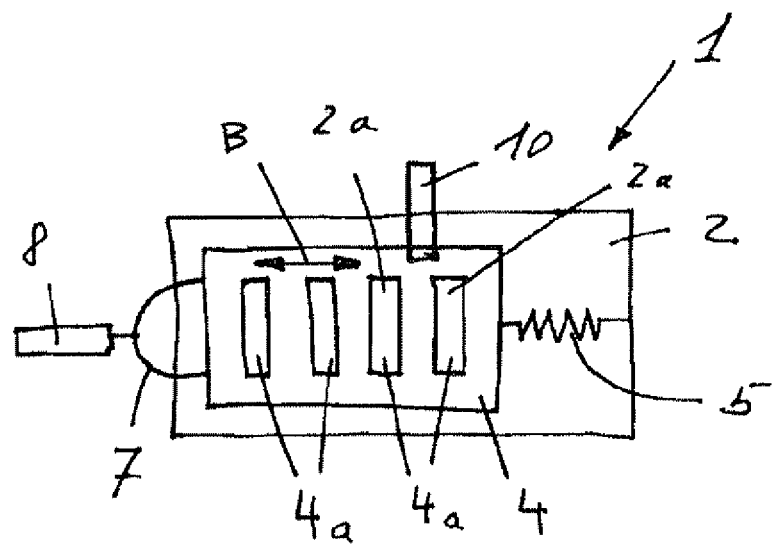
FIG. 11 schematically, a plan view of an actively controlled valve with a linearly movable valve plate.

FIG. 11 schematically shows a further embodiment of a valve 1, with its valve plate 4 being actuated by a linear movement in the direction B. The valve 1 includes a counter-plate 2 having passage openings 2a as well as a valve plate 4 linearly displaceable with respect to the counter-plate 2 and having passage openings 4a. The valve plate 4 is connected to a linear motor 8 via a drive spring 7. A retaining apparatus 10 can block and release the valve plate 4. The embodiment shown could optionally additionally have a holding spring 5 which is only shown schematically as an operative connection between the counter-plate 2 and the valve plate 4. The valve 1 with holding spring 5 shown in FIG. 11 can be operated as described in FIGS. 7, 8 and 9a to 9h, with the only difference that the valve plate does not carry out a rotary movement, but rather a linear movement B.

A holding spring 5 could, as shown in FIG. 5, also be dispensed with in the valves 1 shown in FIGS. 1, 6, 10 and 11. Under the assumption that the valve 1 shown in FIG. 1 does not have a holding spring 5, this would mean in the representations in accordance with FIGS. 9a to 9h that only the spring energy 7a is present, but not the spring energy 5a. The drive spring 7 is rotated by the drive apparatus 10 into the position shown in FIGS. 9a and 9e and the valve plate 4 is then released by the retaining apparatus 10 so that the valve plate 4 moves into the position illustrated in FIGS. 9a and 9h respectively in which the retaining apparatus 10 again blocks the valve plate 4. The aspect is disadvantageous in an embodiment of the valve 1 without a holding spring 5 that the drive apparatus 8 has to deliver the total spring energy 7a required for the switching of the valve 1 or the torque required for this purpose which requires a relatively large, heavy and expensive drive apparatus 8.

Figure 12:
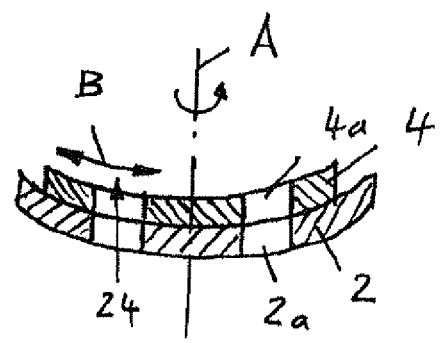
FIG. 12 schematically, a longitudinal section through a base plate extending in curved manner with a valve plate.
Figure 13:
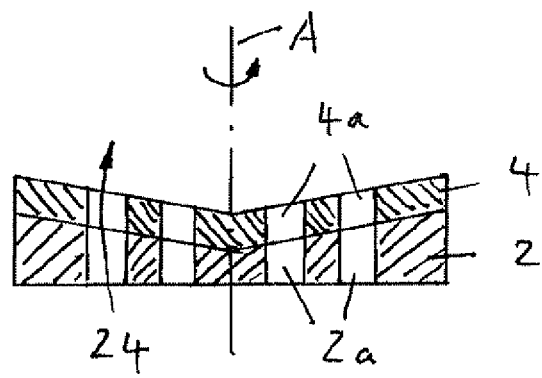
FIG. 13 schematically, a longitudinal section through a base plate extending in V shape with a valve plate.

The valve plate 4 and the counter-plate 2 of the valve 1 can be designed in different manners such that a mutual displacement by means of a rotary movement is possible or a straight-line movement. FIG. 12 schematically shows a spherically extending valve plate 4 with a counter-plate 2 in a longitudinal section, with the valve plate 4 being displaceably supported with respect to the counter-plate 2 either via a movement in rotation about the axis A or via a movement in translation in the direction B to open or close the passage 24 by this movement. FIG. 13 shows a further embodiment having a valve plate 4 and a counter-plate 2 with conically extending support surfaces. The valve plate 4 is rotatably supported about the axis A to open or close the passage 24.

Figure 14:
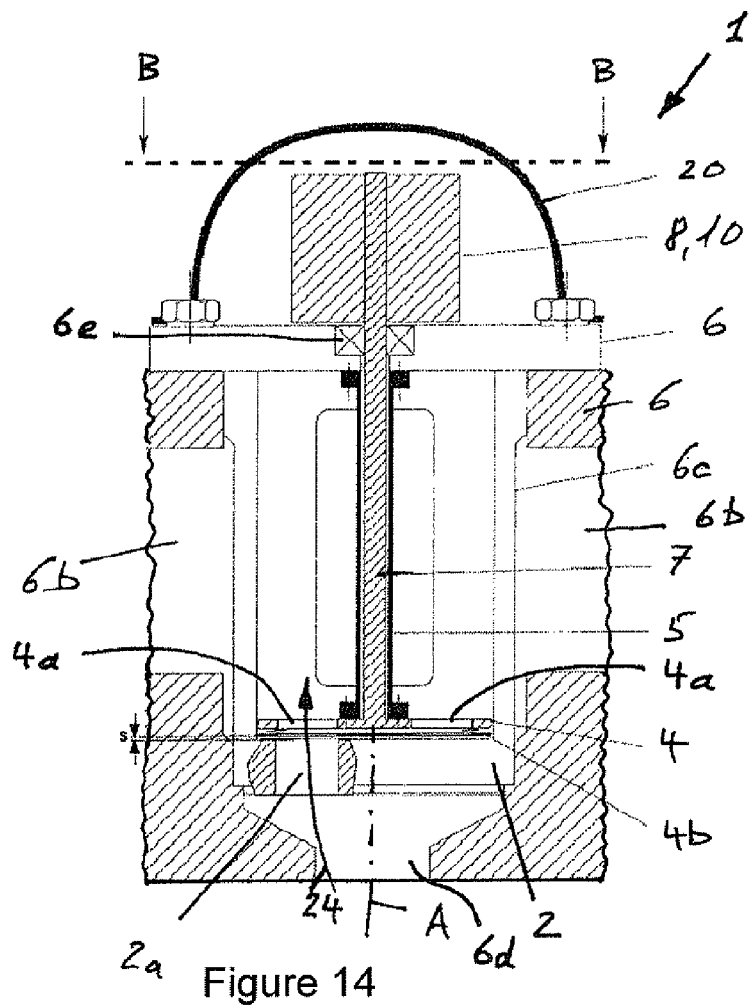
FIG. 14 a longitudinal section through a further embodiment of a valve.

FIG. 14 shows a further embodiment of a valve 1 in a longitudinal section. The valve 1 includes a housing 6 having an inlet opening 6d, outlet openings 6b as well as a so-called lantern 6e with an integrated valve seat and counter-plate 2. The valve 1 includes a drive apparatus 8 which is moreover designed as a holding apparatus 10. These two apparatus 8, 10 are designed such that a torque can be exerted onto the upper section of the drive spring 7. A valve plate 4 is fixedly connected to the drive spring 7 at the lower end of the drive spring 7, with the valve plate 4 being rotatably supported about the axis of rotation A. The valve plate 4 includes a passage opening 4a which is displaceably supported with respect to the passage opening 2a of the counter-plate 2 so that the passage opening 2a and thus the passage 24 can be opened and closed respectively by a rotation of the valve plate 4. In a preferred embodiment, the valve plate 4 is rotated such that the passage opening 2a is completely open in a first position of the valve plate 4 in that the passage opening 4a comes to lie above the passage opening 2a and such that the passage opening 2a is completely closed in a second position of the valve plate 4 in that the passage opening 2a is completely covered by the valve plate 4. It can, however, also prove to be advantageous to rotate the valve plate 4, and thus also the passage opening 4a, with respect to the passage opening 2a such that only a part area of the total passage opening 2a is available as a passage 24, whereas the remaining portion of the passage opening 2a is covered by the valve plate 4.

In an advantageous embodiment, the valve 1 includes a hollow-bar torsion spring 5 which is fixedly connected to the valve plate 4 at the bottom and to the housing 6 at the top. The valve 1 could, however, also be designed without a hollow-bar torsion spring 5. A full-bar torsion spring 7 is arranged within the hollow-bar torsion spring 5 and is fixedly connected to the valve plate 4 at the bottom and to the drive apparatus and holding apparatus 8, 10 at the top.

The valve 1 shown in FIG. 14 is essentially designed as a two-mass oscillator, with the one mass in particular being formed by the valve plate 4 and the other mass in particular being formed by the armature 8e. The valve 1 substantially includes two springs, namely the drive spring 7 and the holding spring 5, with the two-mass oscillator being designed such that the valve plate 4 is connected to the fixed-position housing 6 via the holding spring 5 and such that the valve plate 4 is connected to the armature 8e via the drive spring 7. In an advantageous embodiment, the natural frequencies of the valve plate 4 and of the armature 8e have a real ratio, with the natural frequency in particular depending on the spring stiffness of the springs 5 and 7 and on particular on the mass of the valve plate 4 and of the armature 8e.

It can prove to be advantageous to provide the valve plate 4, as also shown in FIG. 1, with a sealing plate 4b which is resiliently connected to the valve plate 4 via a spring means not shown in FIG. 14. It has moreover proved to be advantageous to cover the drive apparatus and holding apparatus 8, 10 with a protective cap 20, e.g. as protection against contamination. The drive apparatus and holding apparatus 8, 10 is, as shown in FIG. 14, advantageously arranged outside the housing 6 in order not to come into contact with the gas flowing within the valve 1.

Figure 15:
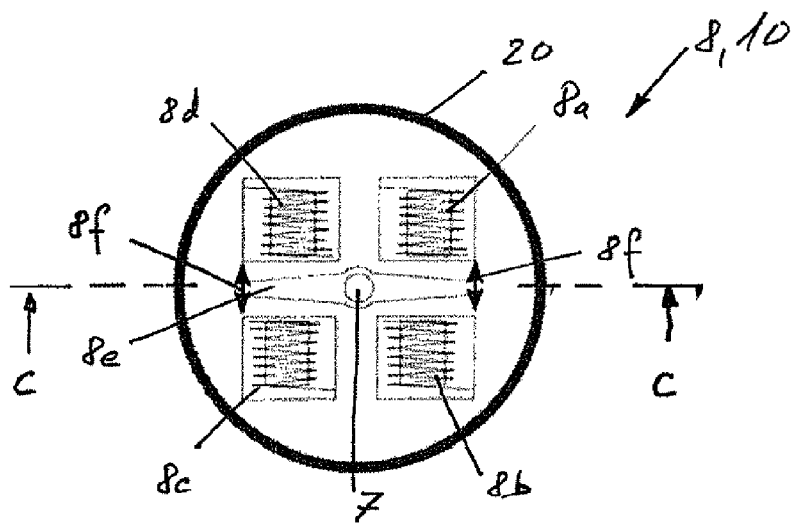
FIG. 15 a plan view of the valve shown in FIG. 14 along the line B-B.

FIG. 15 shows a plan view of the valve 1 shown in FIG. 14 along the line B-B. FIG. 14 shows a section along the line C-C. The drive apparatus 8 shown in FIG. 15 includes four magnets 8a, 8b, 8c, 8d as well as an armature 8e rotatably movably supported to and fro in the direction of movement 8f. The drive spring 7 is rotatably supported with respect to the housing 6 with the aid of a bearing 6e, with the armature 8e being fixedly connected to the end section of the drive spring 7 so that the direction of extent of the drive spring 7 defines an axis of rotation A about which the armature 8e is rotatably supported. The armature 8e is movable to and fro in the direction of movement 8f by a corresponding activation of the magnets 8a, 8b, 8c. 8d.

Figure 16:
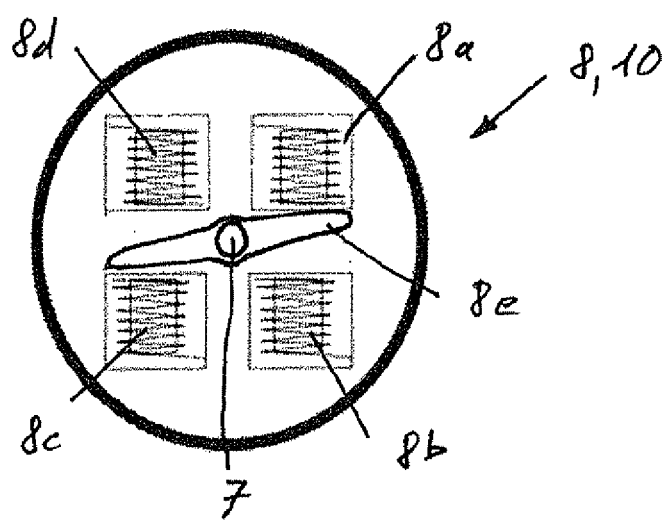
FIGS. 16, 17 the plan view in accordance with FIG. 15 with an attracted armature in the first and second positions.
Figure 17:
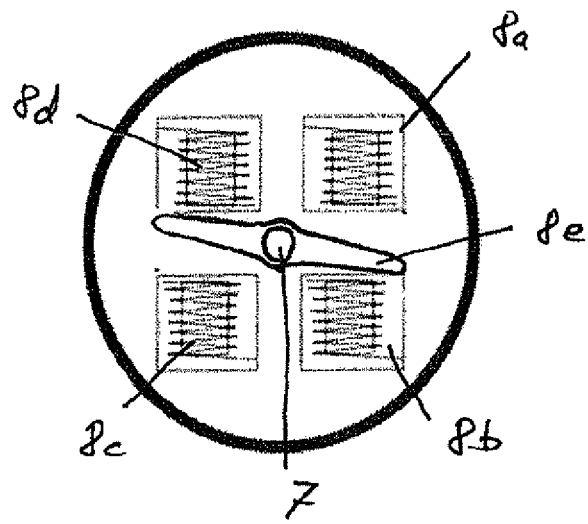

In an advantageous embodiment, the armature 8e is in the rest position shown in FIG. 15, if the magnets 8a, 8b, 8c, 8d are currentless, with the rest position in particular being determined by the hollow bar torsion spring 5. In an advantageous embodiment, the passage 24 is half open in this rest position. FIGS. 16 and 17 show the plan view in accordance with FIG. 15, with the armature 8e being in a first holding position in FIG. 15 and in a second holding position in FIG. 17. Starling from the position of the armature 8c shown in FIG. 15, the magnets 8a, 8b, 8c, 8d can advantageously be controlled alternately such that the armature is set into oscillation in the direction of movement 8f, in a similar manner as shown in FIG. 7 with the angular extent 12, so that the armature 8e is wound up with respect to its rotation and has an increasingly larger angle of rotation as a function of time until the armature 8e is in the first or second holding position shown in FIGS. 16 and 17 in that the armature 8e contacts the corresponding magnets 8e, 8b, 8c, 8d and the magnets 8a, 8b, 8c, 8d are no longer switched over, but rather constantly attract the armature 8e so that the drive 8 thus now acts as a holding apparatus 10 and the armature 8e is held in the position shown in FIGS. 16 and 17 respectively. This wind-up process, however, does not have any holding phases 12b, 12d, unlike the angle/time extent shown in FIG. 7, so that the armature 8e is excited with a continuously increasing amplitude in the direction of movement 8f until the armature 8e is so close to the magnets 8a, 8b, 8c, 8d that it can be fixedly held by the magnets. The control apparatus required for the control of the magnets, moreover preferably including a sensor for the detection of the deflection of the armature 8e, is not shown in detail. The passage openings 2a, 4a are advantageously designed and arranged in a mutually adapted manner such that the first holding position, for example, effects a complete closing of the passage 24 and the second holding position effects a complete opening of the passage 24. The drive 8 with magnets 8a, 8b, 8c, 8d and armature 8e is preferably designed so that a single actuation of the magnets 8a, 8b, 8c, 8d effects a switching over between the first and second holding positions, which has the advantage that a switching over can take place very fast between the holding positions shown in FIGS. 16 and 17 or so that the valve 1 or its passage 24 can be opened or closed very fast.

Figure 18:
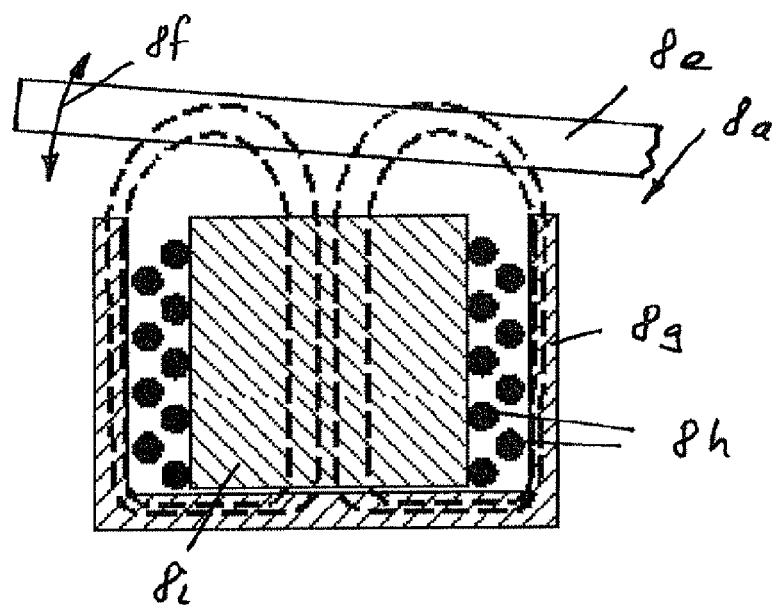
FIG. 18 schematically, a section through a pot magnet with a spaced apart armature.
Figure 19:
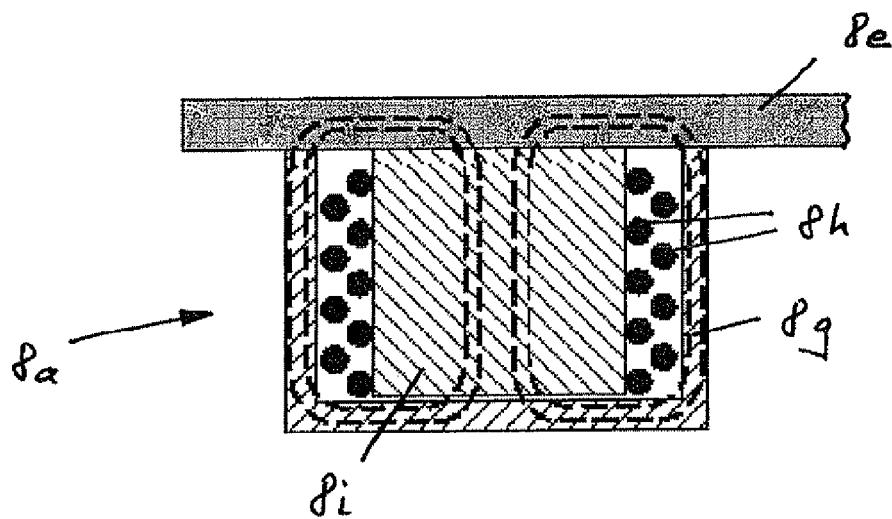
FIG. 19 schematically, a section through a pot magnet with an attracted armature.

FIGS. 18 and 19 show an embodiment of a magnet 8a in a section. The magnet 8a includes a magnet core 8i, an electric winding 8h and a magnetically conductive external housing 8g. The magnetic field is shown in a dashed line. In the embodiment shown, the magnet 8a is designed as a pot magnet. This embodiment has the advantage that relatively large magnetic forces can be generated, in particular a large holding force, and that the pot magnet requires a relatively small volume or has a relatively small construction. In FIG. 18, the armature 8e is spaced apart with respect to the magnet 8a, whereas in FIG. 18 the armature 8e is fixedly held at the magnet 8a. To effect a large holding force, the armature 8e is advantageously designed and arranged so that the armature 8e contacts the magnet 8a over the full surface as shown in FIG. 18.

In the embodiment shown in FIGS. 14 to 19, the armature 8f is directly connected to the drive spring 7. The drive 8 with the armature 8f can, however, also be made as a separate unit which is connected to the drive spring 7 via an operative connection, for example a shaft or a transmission belt, to move the drive spring 7 with the aid of the drive 8.

Figure 20:
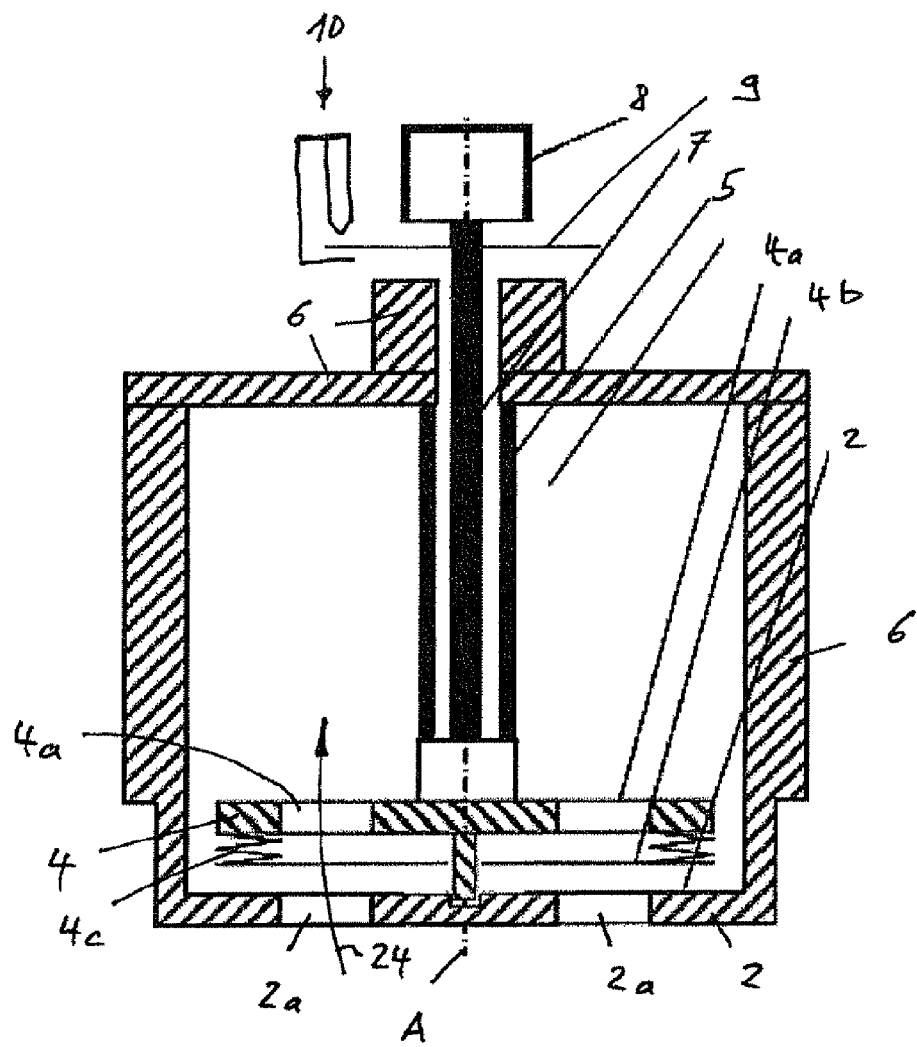
FIG. 20 a longitudinal section through a further embodiment of a valve.

FIG. 20 shows a further embodiment of a valve 1 in a longitudinal section. In comparison with the embodiment shown in FIG. 1, the embodiment shown in FIG. 20 differs in that the retaining disk 9 and the holding apparatus 10 are arranged outside the housing 6, in the embodiment shown at the top at the housing 6. Otherwise, the valve 1 shown in FIG. 20 is designed substantially the same as the valve 1 shown in FIG. 1. The valve 20 shown in FIG. 20 has the advantage that the holding disk 9 and the holding apparatus 10 are not exposed to the gas and contaminants present in the inner space of the housing 6, which inter alia ensures an increased operating safety.

The invention claimed is:

1. An actively controlled valve comprising a housing, said housing comprising,
    a valve plate having passage openings,
    a counter-plate fixedly arranged with respect to the housing and having passage openings, wherein the valve plate is rotatable with respect to the counter-plate such that the passage openings form an open or closed passage, and
    a drive apparatus which rotates the valve plate about a longitudinal axis extending perpendicular to the counter-plate,
    wherein the valve plate is connected to the housing via a hollow-bar torsion spring extending concentrically to the longitudinal axis, and the valve plate is connected to the drive apparatus via a torsion rod extending within the hollow-bar torsion spring and concentrically to the longitudinal axis, wherein the torsion rod is configured to store and release torsional energy supplied by the drive apparatus, and transfer said torsion energy to said hollow-bar torsion spring via rotating said valve plate;
    wherein a controllable holding apparatus is operable such that the position of the valve plate can be fixed.

2. A valve in accordance with claim 1, wherein the drive apparatus includes an armature which comprises an operative connection to the torsion rod; and in that the drive apparatus includes magnets which are arranged with respect to the armature such that they attract the armature.

3. A valve in accordance with claim 2, wherein the armature is fixedly connected to the torsion rod and is rotatably supported about the longitudinal axis.

4. A valve in accordance with claim 1, wherein the drive apparatus is an electric motor which is fixedly connected to the housing.

5. A valve in accordance with claim 4, wherein the electric motor comprises a rotor which is arranged extending concentrically to the longitudinal axis and is fixedly connected to the torsion rod.

6. A valve in accordance with claim 1, wherein the holding apparatus comprises a piezoelectric drive.

7. A valve in accordance with claim 1, wherein a retaining part is connected to the valve plate or to the torsion rod; and in that the holding apparatus engages at the holding part.

8. A valve in accordance with claim 1, wherein the drive apparatus is a controllable holding apparatus.

9. A valve in accordance with claim 1, wherein the valve plate includes a sealing plate having passage openings; and the sealing plate is connected to the valve plate via spring elements.

10. A valve in accordance with claim 1, wherein the torque which can be generated as a maximum by the drive apparatus is smaller than the torque applied as a maximum to the hollow-bar torsion spring.

11. A valve in accordance with claim 1, further comprising a control apparatus and a position sensor for measuring the position of the valve plate; and a control program for the control apparatus which controls the drive apparatus such that the energy provided by the drive apparatus is accumulated in the hollow-bar torsion spring.

12. A method for the operation of an actively controlled valve, the valve comprising a housing, said housing comprising,
   a valve plate,
   a counter-plate fixedly arranged with respect to the housing, wherein the valve plate is rotatable with respect to the counter-plate,
   a drive apparatus which rotates the valve plate about a longitudinal axis extending perpendicular to the counter-plate,
   wherein the valve plate is connected to the housing via a hollow-bar torsion spring extending concentrically to the longitudinal axis, and the valve plate is connected to the drive apparatus via a torsion rod extending within the hollow-bar torsion spring concentrically to the longitudinal axis, wherein the torsion rod is configured to store and release torsional energy supplied by the drive apparatus, and transfer said torsion energy to said hollow-bar torsion spring via rotating said valve plate, and
   a controllable holding apparatus, the method comprising
   fixedly holding the valve plate in a first position by the holding apparatus;
   releasing the valve plate by the holding apparatus so that the valve plate is moved by the energy stored in the torsion rod thereby tensioning the torsion rod by the drive apparatus; and
   holding the valve plate in a second position by the holding apparatus when stationary or approximately stationary.

13. A method in accordance with claim 12, wherein said hollow-bar torsion spring has an operative connection between the counter-plate and the valve plate; and wherein the valve plate is moved step-wise and is held again such that a spring energy is accumulated in the hollow-bar torsion spring which exceeds the energy provided by the drive apparatus.

14. A piston compressor comprising a valve, the valve comprising a housing, said housing comprising,
   a valve plate having passage openings,
   a counter-plate fixedly arranged with respect to the housing and having passage openings, wherein the valve plate is rotatable with respect to the counter-plate such that the passage openings form an open or closed passage, and
   a drive apparatus which rotates the valve plate about a longitudinal axis extending perpendicular to the counter-plate,
   wherein the valve plate is connected to the housing via a hollow-bar torsion spring extending concentrically to the longitudinal axis, and the valve plate is connected to the drive apparatus via a torsion rod extending within the hollow-bar torsion spring and concentrically to the longitudinal axis, wherein the torsion rod is configured to store and release torsional energy supplied by the drive apparatus, and transfer said torsion energy to said hollow-bar torsion spring via rotating said valve plate; and
   wherein a controllable holding apparatus operable such that the position of the valve plate can be fixed.

* * * * *